(12) United States Patent
Wu et al.

(10) Patent No.: US 8,938,509 B2
(45) Date of Patent: Jan. 20, 2015

(54) METHODS AND APPARATUS FOR SUPPORTING SHARING OF PRIVILEGES IN A PEER TO PEER SYSTEM

(75) Inventors: Xinzhou Wu, Monmouth Junction, NJ (US); Junyi Li, Chester, NJ (US); Vincent D. Park, Budd Lake, NJ (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 765 days.

(21) Appl. No.: 12/898,895

(22) Filed: Oct. 6, 2010

(65) Prior Publication Data

US 2012/0089682 A1    Apr. 12, 2012

(51) Int. Cl.
*G06F 15/16* (2006.01)
*H04W 28/24* (2009.01)
*H04W 84/18* (2009.01)

(52) U.S. Cl.
CPC .............. *H04W 28/24* (2013.01); *H04W 84/18* (2013.01)
USPC ............................ 709/206; 709/203; 709/227

(58) Field of Classification Search
USPC .......................................... 709/206, 203, 227
See application file for complete search history.

(56) References Cited

U.S. PATENT DOCUMENTS

| | | | |
|---|---|---|---|
| 6,820,142 B2 * | 11/2004 | Hofstee et al. | 710/25 |
| 7,113,771 B2 * | 9/2006 | Kotzin | 455/414.1 |
| 7,127,613 B2 * | 10/2006 | Pabla et al. | 713/171 |
| 7,711,789 B1 * | 5/2010 | Jnagal et al. | 709/213 |
| 7,894,828 B2 * | 2/2011 | Dawson et al. | 455/456.1 |
| 8,335,844 B2 * | 12/2012 | Chapalamadugu et al. | 709/223 |
| 8,769,113 B2 * | 7/2014 | Castro Castro et al. | 709/227 |
| 2002/0059943 A1 * | 5/2002 | Inagaki | 134/18 |
| 2005/0243755 A1 | 11/2005 | Stephens | |
| 2006/0149845 A1 | 7/2006 | Malin et al. | |
| 2008/0056135 A1 * | 3/2008 | Lee et al. | 370/236 |
| 2008/0155100 A1 * | 6/2008 | Ahmed et al. | 709/226 |

(Continued)

FOREIGN PATENT DOCUMENTS

| | | |
|---|---|---|
| JP | 2012533916 A | 12/2012 |
| WO | WO02096036 A1 | 11/2002 |

(Continued)

OTHER PUBLICATIONS

International Search Report and Written Opinion—PCT/US2011/054810—ISA/EPO—Dec. 20, 2011.

(Continued)

*Primary Examiner* — Duyen Doan
(74) *Attorney, Agent, or Firm* — James K. O'Hare

(57) ABSTRACT

Various methods and apparatus relate to sharing QoS privileges between devices having a higher service level subscription and devices having lower service level subscription. QoS privileges are associated with a QoS service level which is in turn tied to devices, e.g., based on a service level subscription of the device. Devices with higher service level subscription are entitled to superior QoS privileges than the devices with lower service level subscription. In various embodiments a first device with higher QoS service level provides, to a second device having lower QoS service level, information used to obtain a QoS privilege to which the first device is entitled. Thus the second device entitled to lower QoS privileges is provided with the superior QoS privileges on a limited basis, e.g., for communicating with the first device corresponding to the higher QoS service level.

23 Claims, 8 Drawing Sheets

(56) References Cited

U.S. PATENT DOCUMENTS

| | | | |
|---|---|---|---|
| 2008/0289023 A1* | 11/2008 | Wardrop | 726/9 |
| 2008/0299911 A1 | 12/2008 | Chen et al. | |
| 2008/0300997 A1* | 12/2008 | Dawson et al. | 705/26 |
| 2008/0310303 A1* | 12/2008 | Wang et al. | 370/230.1 |
| 2008/0317054 A1* | 12/2008 | Yin | 370/401 |
| 2009/0003306 A1 | 1/2009 | Plutov et al. | |
| 2009/0190471 A1 | 7/2009 | Mahendran et al. | |
| 2009/0219853 A1 | 9/2009 | Hart et al. | |
| 2010/0011103 A1* | 1/2010 | Luzzatti et al. | 709/226 |
| 2010/0115085 A1* | 5/2010 | Saffre et al. | 709/224 |
| 2010/0220676 A1* | 9/2010 | Grandblaise et al. | 370/329 |
| 2011/0051731 A1* | 3/2011 | Mang et al. | 370/395.21 |
| 2011/0258338 A1* | 10/2011 | Vass | 709/233 |
| 2011/0305208 A1* | 12/2011 | Wu et al. | 370/329 |
| 2012/0059943 A1* | 3/2012 | Castro Castro et al. | 709/227 |

FOREIGN PATENT DOCUMENTS

| | | |
|---|---|---|
| WO | WO2006099025 A2 | 9/2006 |
| WO | WO2007111406 A1 | 10/2007 |
| WO | WO-2009089455 A1 | 7/2009 |
| WO | WO-2010133251 A1 | 11/2010 |
| WO | WO-2011020498 A1 | 2/2011 |
| WO | WO-2011159828 A1 | 12/2011 |

OTHER PUBLICATIONS

3rd Generation Partnership Project;Technical Specification Group Services and System Aspects;Quality of Service (QoS) concept and architecture(Release 9) 3GPP TS23.107, Jun. 2010, V9.1.0, P.11-23 ,38, URL, http://www.qtc.jp/3GPP/Specs/23107-910.pdf.

* cited by examiner

500

| QoS SERVICE LEVEL | ASSOCIATED QoS PRIVILEGES | TOKEN GENERATION RATES (TOKENS/SEC) |
|---|---|---|
| FIRST, E.G., GOLD | G1, G2,..., Gn | RATE 1, E.G., 6 |
| SECOND, E.G., SILVER | S1, S2..., Sn | RATE 2, E.G., 3 |
| THIRD, E.G., BRONZE | B1, B2,.., Bn | RATE 3, E.G., 2 |
| ⋮ | ⋮ | ⋮ |

502 is QoS SERVICE LEVEL column; 504 is ASSOCIATED QoS PRIVILEGES column; 506 is TOKEN GENERATION RATES column.

| NUMBER OF TOKENS USED | QoS PRIVILEGE USED |
|---|---|
| 3 | G1, E.G., A FRACTION OF TIME GOLD USER CAN ACCESS COMMUNICATIONS RESOURCES PER TRAFFIC TRANSMISSION SLOT |
| 2 | G2, E.G., ALLOWED TRANSMISSION POWER FOR GOLD USER |
| 2 | G3, E.G., ALLOWED TRANSMISSION DATA RATE FOR GOLD USER |
| 2 | S1, E.G., A FRACTION OF TIME SILVER USER CAN ACCESS COMMUNICATIONS RESOURCES PER TRAFFIC TRANSMISSION SLOT |
| 1 | S2, E.G., ALLOWED CODING RATE FOR SILVER USER |
| 1 | B1, E.G., ALLOWED TRANSMISSION POWER FOR BRONZE USER |
| ⋮ | ⋮ |

Rows labeled 606, 608, 610, 612, 614, 616. Columns 602 (NUMBER OF TOKENS USED) and 604 (QoS PRIVILEGE USED).

FIGURE 6

METHODS AND APPARATUS FOR SUPPORTING SHARING OF PRIVILEGES IN A PEER TO PEER SYSTEM

FIELD

Various embodiments relate to wireless communications, and more particularly, to methods and apparatus for allowing Quality of Service (QoS) privileges to be shared in a peer to peer communications system.

BACKGROUND

In Peer-To-Peer Networks it is often common to associate a QoS level with a device or a user of device. This works well where control is implemented in a distributed manner which is often the case in peer-to-peer systems. The QoS level may be used to determine such things a guaranteed amount of bandwidth, latency and/or loss rate or level of priorities in the scheduling process, e.g., when deterministic rate guarantee is not possible.

A problem to such an approach when two devices seeking to communicate with one another are entitled to different levels of service. Consider for example the case of a first user entitled to a high QoS level, e.g., a Gold service level user, seeking to communicate with another user entitled to a lower QoS level of service, e.g., a Bronze level user.

Allowing the QoS level of the transmitting device to control transmissions would result in transmission from the Gold level user being communicated to the Bronze level user in accordance with the high QoS level to which the Gold user is entitled but with the communication from the Bronze level user to the Gold user being subject to the QoS level to which the Bronze user is entitled. While this might seem like a reasonable approach with each user being entitled to the service level to which they subscribed, applying the lower QoS level associated with the lower (Bronze) level user to the communications to the Gold user may result in the Gold level user receiving communications at a much lower QoS level than the Gold user is accustomed to receiving and/or is seeking to obtain. When a Gold user is running an interactive application whose performance depends on the response from the other user, the performance the Gold user sees is affected by the QoS level of the other user in the communication. Given the nature of P2P networks, users with different QoS levels may encounter each other and may want to communicate with one another.

To maintain a customer's satisfaction with a QoS service level to which they subscribe, it is important that the customer receive an experience commensurate with the QoS level to which they subscribe even when communicating with users who subscribe to lower level QoS subscriber agreements. However, for the QoS mechanism to be effective, as well as from a business perspective, it is also important to maintain a distinction between the QoS levels provided.

In view of the above discussion, it should be appreciated that there is a need for improved methods and apparatus for implementing QoS levels in a peer to peer system where users may subscribe to subscriber service agreements corresponding to different QoS levels.

SUMMARY

Various methods and apparatus which support sharing of QoS privileges, e.g., temporarily, between a communications device with a higher QoS service level and one or more other communications devices with lower QoS service levels, in a wireless communications system are described. Various described methods and apparatus are well suited for use in a peer to peer communications network.

In accordance with at least some embodiments, a peer-to-peer device with higher level of QoS privileges than a second device with which it is seeking to communicate is allowed to share some or all of its QoS privileges with the second device. The QoS sharing may be for a limited time and potentially limited on a communication session and/or application basis. Thus in at least some embodiments a device in a set of devices which are having a communications session, entitled to a lower level of QoS level than another device in the set, is provided with the QoS level of the device in the set with the higher level of QoS on a limited basis, e.g., for purposes of communicating with the device corresponding to the higher level of QoS. In this manner the device entitled to the higher level of QoS benefits from its QoS level subscription even while communicating with devices entitled to a lower QoS level. However, in some embodiments, the device entitled to the lower QoS level is limited in that it receives the higher QoS level on a limited basis, e.g., for communication with the device entitled to the higher QoS level and/or for applications or communications authorized by the higher QoS level device to receive the benefits of the higher QoS level.

Control over sharing of QoS levels is achieved, in some embodiments, by the passing of QoS parameters from the primary device (device with high QoS level) to the secondary device (device with low QoS level). This may be done by way of a QoS information and/or rights sharing message sent from the primary device to the secondary device. The QoS information and or rights sharing message may include parameters which are used to obtain the QoS privileges, e.g., a key, QoS token generation information or some other security information used to control access to QoS related privileges. The parameters may be valid for a limited time and/or for use with a particular application. Such time constraints may, and in some embodiments are, expressly specified in the QoS sharing message. The rights to QoS privileges made possible by the information included in a QoS privilege sharing message may be limited to use for communications between, e.g., to/from, primary and secondary devices in a communications. The QoS privileges sharing message may include identifiers corresponding to each device in a communications session which may use the QoS privileges/rights granted by the QoS privilege sharing message. In some embodiments where more than two device are in a communications session, the QoS privilege sharing message may grant multiple devices, e.g., two or 3 devices, the right to share in the QoS privileges of the primary device participating in a multi-party communications session. The primary device may participate at a given time in multiple different communications sessions, e.g., with different secondary devices. Via the exchange of parameters, the primary device has control over the QoS level provided to the secondary device, for communications with the primary device. In some embodiments, the use of QoS privileges are controlled through use of QoS tokens. In such embodiments the parameters communicated in a QoS privileges sharing message may include tokens used for QoS purposes and/or information used to control the generation of tokens used to control QoS privileges. The primary device may be constrained in its ability to issue tokens, e.g., to the issuance of tokens useful for communications with the primary device but not other devices. In addition the secondary device may be subject to constraints regarding QoS tokens. In some embodiments the secondary device may not be entitled to transfer/share the QoS privileges it obtained from the primary device via QoS sharing message to any other device.

In some but not all embodiments, the QoS privileges of the device granting one or more other devices the right to share QoS privileges has its QoS level reduced to mitigate the overall effect of sharing QoS privileges with one or more other devices. In such embodiments, for example, a Gold level device may have its right to generate QoS tokens used to gain access to QoS privileges reduced slightly to take into consideration the limited grant of QoS privileges to another device. In some embodiments the reduction in QoS privileges to the high priority user lowers the QoS level provided to the high priority level user but not to the point where the high priority level user receives a service level equal to or lower than the next available service level, e.g., a silver service QoS service level. In some but not all embodiments the reduction in QoS privileges to a high priority level user sharing QoS privileges is equal to the amount of increase in QoS privileges provided to the device with which QoS privileges are being shared. In general, the reduction in QoS privileges can be a function of at least some of the following parameters: QoS level of primary device, number of secondary devices with which the primary device shares its QoS privileges, QoS level of the secondary devices, amount of increase in the QoS levels of the secondary devices.

An exemplary method of operating a first peer to peer device, in accordance with some embodiments, comprises transmitting to a second peer to peer device a QoS sharing message providing the second peer to peer device with information used to obtain a QoS privilege to which the first peer to peer device is entitled; and receiving from the second peer to peer device a communications signal transmitted using the QoS privilege obtained by the second peer to peer device based on the information included in said QoS sharing message.

An exemplary first peer to peer device, in accordance with some embodiments, comprises: at least one processor configured to: transmit to a second peer to peer device a QoS sharing message providing the second peer to peer device with information used to obtain a QoS privilege to which the first peer to peer device is entitled; and receive from the second peer to peer device a communications signal transmitted using the QoS privilege obtained by the second peer to peer device based on the information included in said QoS sharing message. The exemplary first peer to peer device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 5 illustrates an exemplary table including information regarding various QoS service levels and different associated elements corresponding to each of the QoS service levels, in accordance with an exemplary embodiment.

FIG. 6 illustrates an exemplary table which shows various QoS privileges and the number of tokens spent to assert the different QoS privileges, in accordance with an exemplary embodiment.

DETAILED DESCRIPTION

Figure 1:
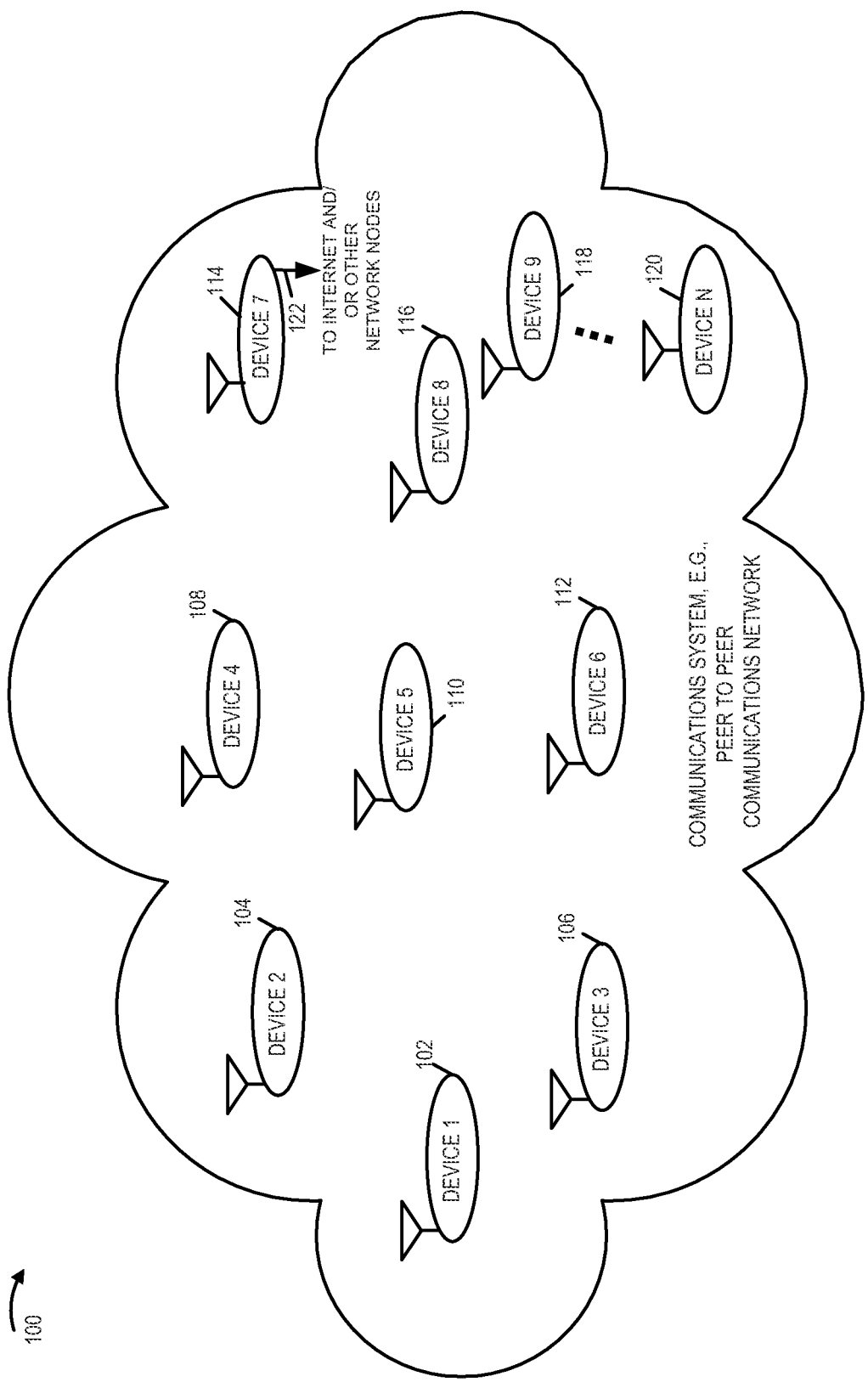
FIG. 1 is a drawing of an exemplary wireless communications system, e.g., peer to peer wireless communications system, in accordance with an exemplary embodiment.

FIG. 1 is a drawing of an exemplary wireless communication system 100, e.g., a peer to peer communications system in accordance with an exemplary embodiment. Exemplary wireless communications system 100 includes a plurality of wireless communications devices, e.g., peer to peer devices, including device 1 102, device 2 104, device 3 106, device 4 108, device 5 110, device 6 112, device 7 114, device 8 116, device 9 118, . . . , device N 120. Some of the wireless communications devices in system 100, e.g., device 7 114, include an interface 122, to the Internet and/or other network nodes. Some of the wireless communications devices in system 100, e.g., device 1 102, device 2 104, device 3 106, device 4 108, device 5 110, device 6 112, device 8 116, device 9 118 and device N 120, are mobile wireless terminals, e.g., handheld mobile devices.

Each wireless communications device in system 100 has a QoS service level associated with it. Different devices are associated with various different QoS levels, e.g., based on the service level subscription, e.g., QoS service levels Gold, Silver, Bronze etc., as will be discussed in greater detail later. Different QoS service levels have various QoS privileges associated with them. Devices having a higher QoS service level have higher QoS privileges. For example QoS privileges associated with a device may correspond to fraction of times the device can access communications resources in a given time period, number of communications resources that the device can access in a given period of time, an allowed transmission power level, data rates the device is allowed to use for the device traffic, allowed coding rate, encoding method, etc. A wireless communications device in system 100, e.g., device 1 102, having a higher QoS service level generates a QoS sharing message including information which is used to obtain one or more QoS privileges to which the device 1 102 is entitled. In accordance with one feature, communications device 1 102 transmits this QoS sharing message to another device, e.g., second device 2 104, with which it is seeking to communicate, so that the second device 2 102 may share at least some QoS privileges to which the device 1 102 is entitled.

Figure 2:
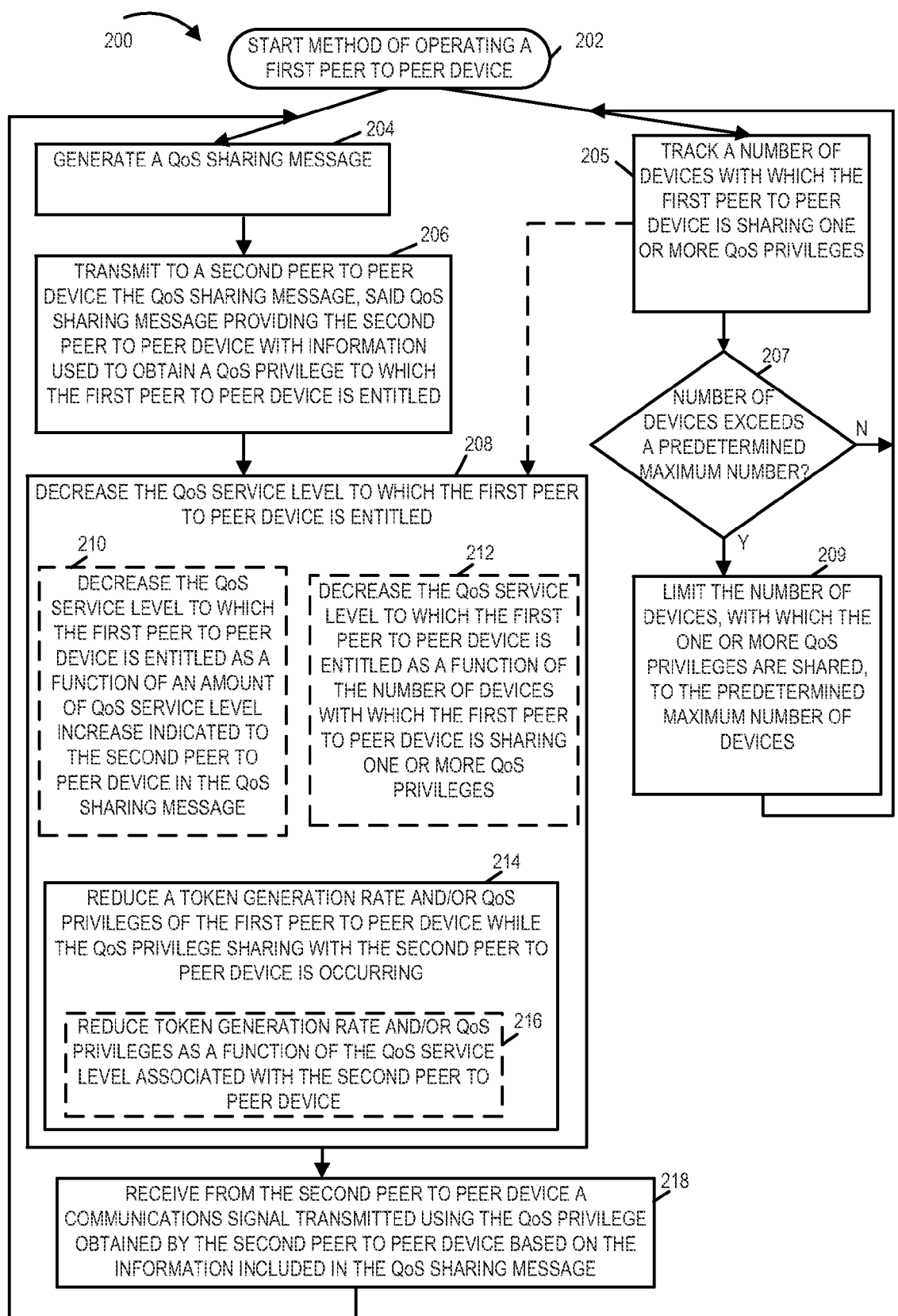
FIG. 2 is a flowchart of an exemplary method of operating a first peer to peer device in accordance with an exemplary embodiment.

FIG. 2 is a flowchart 200 of an exemplary method of operating a first peer to peer device, in accordance with an exemplary embodiment. The first peer to peer device implementing the method of flowchart 200 is, e.g., any one of the wireless communications devices of system 100 of FIG. 1. For the purpose of discussion of the steps shown in the exemplary method of flowchart 200 we assume that the first peer to peer device is the first device 1 102. As will be discussed, in accordance with one feature of various embodiments, the first peer to peer device 102 with a higher QoS service level shares one or more of its QoS privileges with a second peer to peer device with a lower QoS service level. Operation starts in step 202, where the first peer to peer device is powered on and initialized. Operation proceeds from start step 202 to steps 204 and 205 which may be independently performed in parallel.

In step 204, the first peer to peer device 102 generates a QoS (Quality of Service) sharing message. Operation proceeds from step 204 to step 206 where the device 1 102 transmits to a second peer to peer device, e.g., device 2 104, the QoS sharing message providing the second peer to peer device with information used to obtain a QoS privilege to which the first peer to peer device 1 102 is entitled. In various embodiments the QoS privilege corresponds to a QoS service level to which the user of the first peer to peer device 102 subscribes, and which is higher than a QoS service level to which the user of said second peer to peer device 104 subscribes. In some embodiments, a QoS service level corresponding to the QoS privilege obtained by the second peer to peer device 104, using QoS sharing message information from the first peer to peer device 102, is higher than a QoS service level needed to support an application or communications session between the first and second peer devices 102, 104.

In various embodiments devices can access QoS privileges by expending so called QoS tokens. A device generates QoS tokens within the device at a rate which is a function of a QoS service level associated with that device. In some embodiments higher the QoS service level for a device higher the QoS token generation rate for that device. The device then expends the generated QoS tokens to assert the QoS privileges and access communications resources, e.g., access peer to peer traffic segments and/or other communications resources, for communications purposes. The QoS privileges in some embodiments include, e.g., fraction of times a device can access or attempt to access the communications resources, how many resources it can access in a given time period, allowed transmission power level, etc. Thus it should be appreciated that using the generated tokens, a device can access or attempt to access the communications resources in a manner which is a function of the QoS privileges to which that device is entitled. Thus first device 102 with higher QoS service level (and hence higher/superior QoS privileges) can usually, e.g., more frequently access communications resources in a given time period, and/or can access greater number of resources, as compared to devices with lower QoS service levels. However for using some higher QoS privileges, greater number of tokens are be used. Accordingly, the higher QoS service level devices typically are granted a higher token generation rate by the service provider as they pay a premium for high QoS service level.

In some embodiments the information used to obtain said QoS privilege includes information indicating the right to generate tokens used to obtain a level of service corresponding to a QoS service level, e.g., QoS service level associated with the first device 1 102. In some embodiments rate of token generation is specified by the first device 1 102. In some embodiments, obtaining a QoS privilege to which the first peer to peer device 1 102 is entitled includes gaining a right to generate tokens at the rate to which the first device 102 is entitled, for a limited time period. This enables the second device 104 which obtains the QoS privilege to access communications resources, e.g., high priority traffic transmission resources, in the same manner as the higher QoS service level device 102 for a limited period of time. For example, the second peer device 104 after obtaining a QoS privilege may be able to grab a greater number of communications resources, e.g., high priority traffic resources, more often and thus support a higher data rate for communicating with the first device 102. In various exemplary embodiments the QoS sharing message provides information used to obtain the QoS privilege for communication with the first peer to peer device 102 but not with other devices. Thus in some embodiments the second device 104 may use the information provided by the QoS sharing message to obtain a QoS privilege to communicate with the first device, however the second device 104 may not be allowed to use the obtained QoS privileges for communications with any other device. In some embodiments the QoS sharing message includes a time indicator indicating a period of time for which the QoS privilege is valid. For example, if the QoS privilege obtained using the information in the QoS sharing message from the first device 102 is, e.g., a data rate, which the second device 104 can use for communicating with the first device 102, then the QoS sharing message in some such embodiments indicates a time for which the data rate can be used for communications to the first device 102.

In some embodiments the QoS sharing message provides information regarding restrictions on the use of the obtained QoS privilege by the second peer to peer device 104 for the communication with the first peer to peer device 102. In some such embodiments the restrictions include at least one of a duration, session, or applications for which the obtained QoS privilege by the second peer to peer device can be used. In some embodiments the QoS sharing message includes an application indicator indicating a type of application for which the QoS privilege may be used. In some such embodiments the application indicator indicates one of a voice application and a video application. Operation proceeds from step 206 to step 208

Returning to step 205. In step 205 the first peer to peer device 102 tracks a number of devices with which the first peer to peer device 102 is sharing one or more QoS privileges. In some embodiments there could be a plurality of devices with which the first device 102 may want to share one or more of the QoS privileges to which it is entitled, while communicating with them. However in some embodiments there is limit on the maximum number of devices with which the QoS privileges can be shared. Operation proceeds from step 205 to step 207 wherein it is determined whether the number of devices with which one or more QoS privileges are shared exceeds a predetermined maximum number of devices. Based on the determination, if the number of devices exceeds the maximum predetermined number of devices, the operation proceeds from step 207 to step 209. In step 209 the number of device with which one or more QoS privileges are shared is limited so that it is equal to or below the predetermined number of devices. The operation proceeds from step 209 back to step 205. If in step 207 the determined number does not exceed the maximum predetermined number of devices the operation proceeds from step 207 back to step 205.

Returning to step 208. In step 208 the QoS service level to which the first peer to peer device 102 is entitled, is decreased. In some embodiments one or more of the steps 210, 212 and 214 may be implemented as part of step 208 in any given embodiment. In some embodiments, the QoS sharing message indicates an amount of QoS service level increase the second device 104 is entitled for communications with the first device 102. In some such embodiments, when step 210 is performed the QoS service level to which the first device 102 is entitled is decreased as a function of the amount of QoS service level increase indicated to the second device 104 in the QoS sharing message. For example, in one embodiment the QoS sharing message indicates a QoS service level increase for the second device 104, e.g., by one level, and the QoS service level for the first device 102 is decreased by one level in step 210. However this is just a mere example and variations are possible.

In step 212 the QoS service level to which the first peer to peer device 102 is entitled is decreased as a function of the number of devices with which the first device 102 is sharing one or more QoS privileges (the number of devices is tracked as discussed in step 205). In step 214 a token generation rate and/or QoS privileges of the first peer to peer device 102 is reduced while sharing the QoS privilege with the second device 104 is occurring. In some embodiments, optional step 216 is implemented as part of step 214. In step 216 the token generation rate and/or QoS privileges of the first device 102 is/are reduced as a function of the QoS service level associated with the second device 104. In various embodiments the token generation rate for a given device is based on the QoS service level associated with that device (or device user), as QoS service level is tied to the level of subscription. In various embodiments the second device 104 has a QoS service level which is lower than the QoS service level associated with the first device 102. Accordingly, in accordance with one feature when the QoS privilege sharing occurs, the amount of reduction in token generation rate of the first device 102, i.e., the higher QoS service level device, is a function of QoS service level associated with the second device 104, i.e., the lower QoS service level device. In some embodiments the amount of reduction in token generation rate and/or QoS privileges of the first device 102 is proportional to the increase in the amount of token generation rate for the second device 104.

Operation proceeds from step 208 to step 218. In step 218 the first peer to peer device 102 receives from the second peer to peer device 104, a communications signal transmitted using the QoS privilege obtained by the second device 104 based on the information included in the QoS sharing message. In some embodiments the QoS sharing message includes information used to determine at least one of time, frequency, phase, power amplitude of transmission, code rate, encoding method, periodicity, and duty cycle of the communications signal.

In various embodiments, the communications resource includes at least one of time, frequency, phase, power, and amplitude of transmission.

Figure 3:
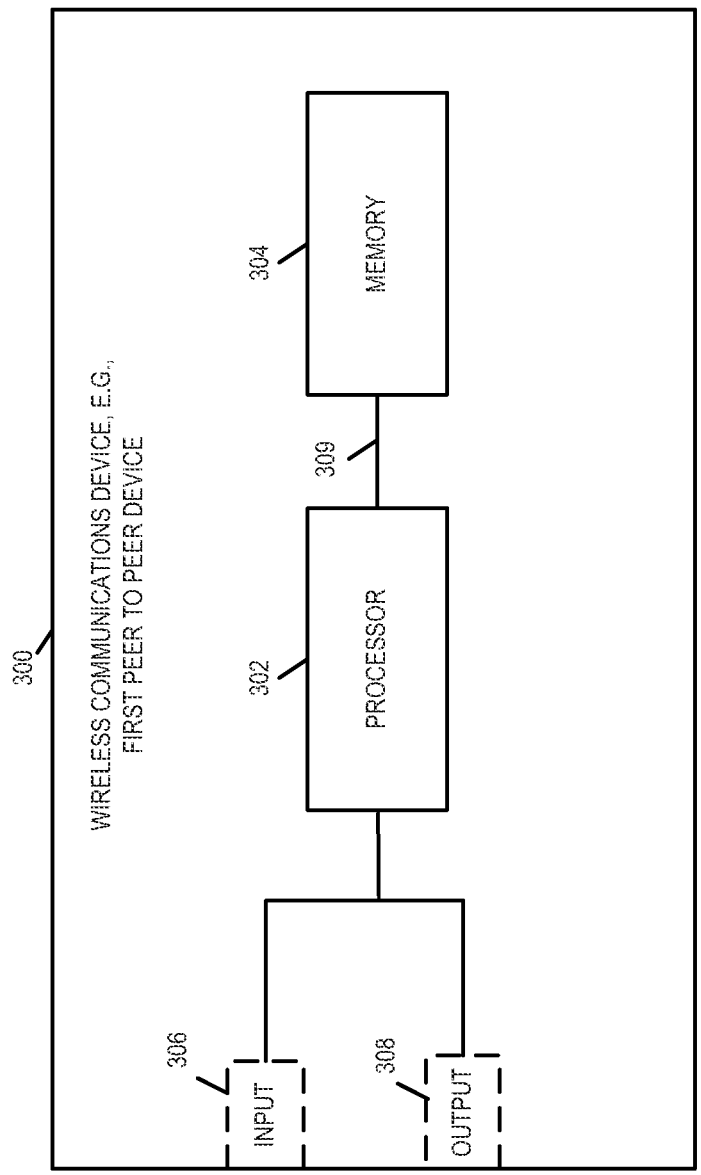
FIG. 3 is an exemplary peer to peer device in accordance with an exemplary embodiment.

FIG. 3 is a drawing of an exemplary first peer to peer device 300, in accordance with an exemplary embodiment. Exemplary peer to peer device 300 is, e.g., one of the wireless communications devices of FIG. 1. Exemplary peer to peer device 300 may, and sometimes does, implement a method in accordance with flowchart 200 of FIG. 2.

The first peer to peer device 300 includes a processor 302 and memory 304 coupled together via a bus 309 over which the various elements (302, 304) may interchange data and information. The first peer to peer device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to generate a QoS sharing message, transmit to a second peer to peer device the QoS sharing message providing the second peer to peer device with information used to obtain a QoS privilege to which the first peer to peer device 300 is entitled, and receive from the second peer to peer device a communications signal transmitted using the QoS privilege obtained by the second peer to peer device based on the information included in said QoS sharing message. In some embodiments the processor 302 is configured to include in said generated QoS sharing message, information used to determine at least one of time, frequency, phase, power, amplitude of transmission, code rate, encoding method, periodicity and duty cycle of said communications signal. In some embodiments the QoS privilege corresponds to a QoS service level to which a user of the peer to peer device 300 subscribes and which is higher than a QoS service level to which the user of said second peer to peer device subscribes. In various exemplary embodiments the QoS sharing message provides information used to obtain the QoS privilege for communication with the first peer to peer device 300 but not with other devices.

In various embodiments, processor 302 is further configured to include in said generated QoS sharing message, a time indicator indicating a period of time for which the QoS privilege is valid, and to include an application indicator indicating a type of application for which the QoS privilege may be used. In some embodiments the information used to obtain said QoS privilege includes information indicating the right to generate tokens used to obtain a level of service corresponding to a QoS service level, e.g., QoS service level associated with the first device 1 102. In some such embodiments the processor 302 is further configured to reduce a token generation rate of the first peer to peer device 300 while sharing the QoS privilege with the second device 104 is occurring. In some embodiments, processor 302 is configured to reduce the token generation rate of the peer to peer device 300 as a function of the QoS service level associated with the second device. In various embodiments the second peer to peer device 104 has a QoS service level which is lower than the QoS service level associated with the first peer to peer device 300.

In some embodiments the QoS sharing message indicates an amount of QoS service level increase the second peer to peer device is entitled for communications with the first peer to peer device 300. In some such embodiments, the processor 302 is further configured to decrease QoS service level to which the first device 300 is entitled as a function of the amount of QoS service level increase indicated to the second peer to peer device in the QoS sharing message.

In some embodiments the processor 302 is further configured to track the number of devices with which the first peer to peer device 300 is sharing one or more of its QoS privileges. The processor 302 is further configured in some embodiments to limit the number of device with which one or more QoS privileges are shared, to a predetermined number of devices. In some embodiments the processor 302 is further configured to decrease the QoS service level to which the peer to peer device 300 is entitled as a function of the number of devices with which the device 300 is sharing one or more QoS privileges.

Figure 4:
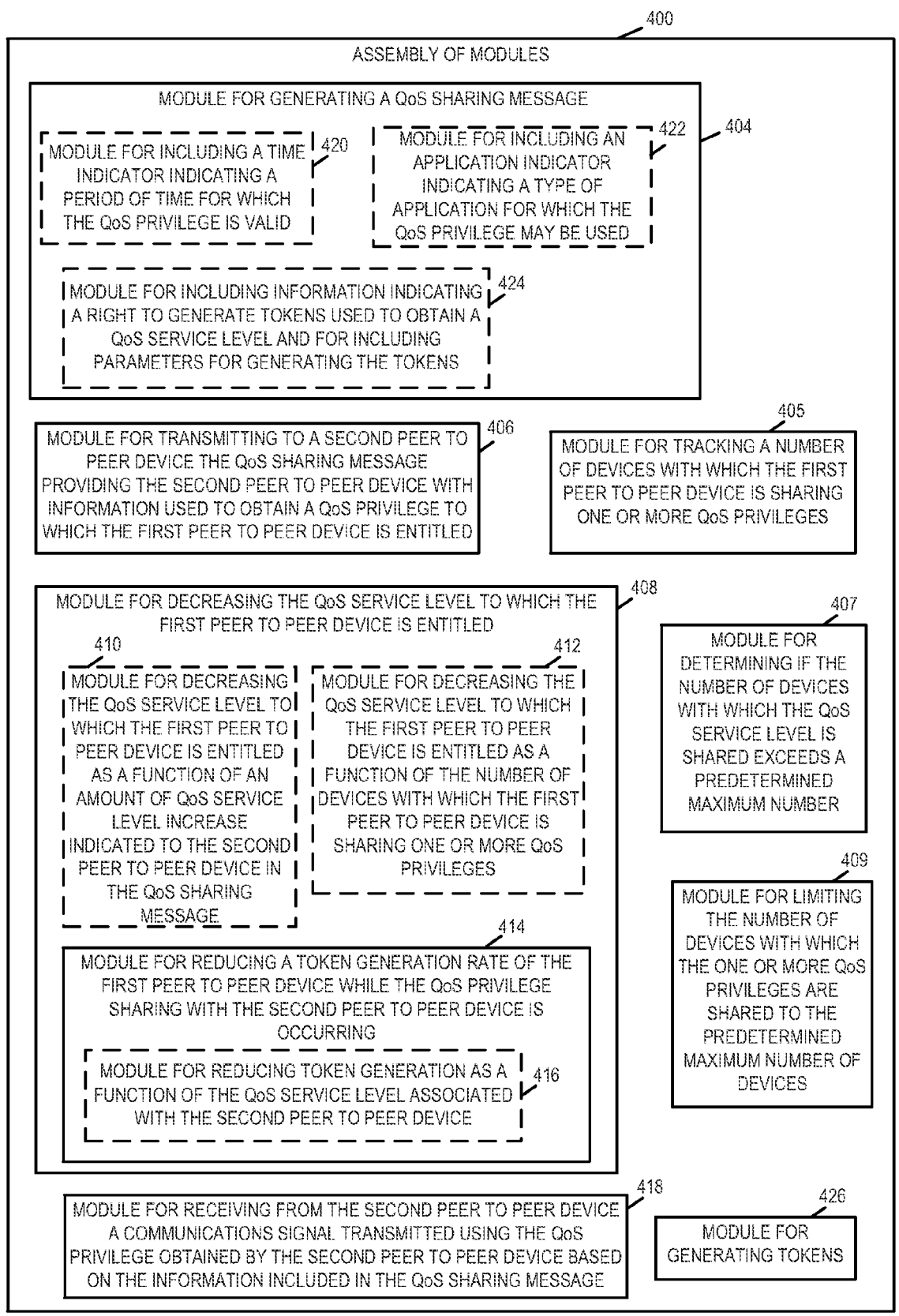
FIG. 4 is an assembly of modules which may be used in the exemplary peer to peer device of FIG. 3.

FIG. 4 illustrates an assembly of modules 400 which can, and in some embodiments is, used in the peer to peer communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the peer to peer device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

The assembly of modules 400 includes a module corresponding to each step of the method of flowchart 200 shown in FIG. 2. The module in FIG. 4 which performs or controls the processor 302 to perform a corresponding step shown in flowchart 200 is identified with a number beginning with 4 instead of beginning with 2. For example module 404 corresponds to step 204 and is responsible for performing the operation described with regard to step 204. The assembly of modules 400 includes a module 404 for generating a QoS sharing message, a module 406 for transmitting the QoS sharing message to a second peer to peer device, providing the second peer to peer device with information used to obtain a QoS privilege to which the first peer to peer device 300 is entitled and, a module 408 for decreasing the QoS service level to which the first peer to peer device 300 is entitled. In some embodiments the module 404 also includes one or more of a module 420 for including a time indicator, in the QoS sharing message, indicating a period of time for which the QoS privilege is valid, a module 422 for including, in the QoS sharing message, an application indicator indicating a type of application for which the QoS privilege may be used, and a module 424 for including information indicating a right to generate tokens used to obtain a level of service corresponding to a QoS service level.

The assembly of modules 400 further includes a module 405 for tracking a number of devices with which the first peer to peer device is sharing one or more QoS privileges, a module 407 for determining if the number of devices with which one or more QoS privileges are shared exceeds a predetermined maximum number, and a module 409 for limiting the number of devices with which one or more QoS privileges are shared to the predetermined maximum number of devices.

In some embodiments, the QoS sharing message indicates an amount of QoS service level increase the second peer to peer device is entitled for communications with the first peer to peer device. In some such embodiments, module 408 also includes a module 410 for decreasing the QoS service level to which the first peer to peer device is entitled as a function of an amount of QoS service level increase indicated to the second peer to peer device in the QoS sharing message. In various embodiments module 408 further includes a module 412 for decreasing the QoS service level to which the first peer to peer device is entitled as a function of the number of devices with which the first device is sharing one or more QoS privileges, a module 414 for reducing a token generation rate of the first peer to peer device 102 while sharing the QoS privilege with the second peer to peer device is occurring. In some embodiments module 412 receives an input from the tracking module 405. In some embodiments, module 414 further includes a module 416 for reducing the token generation rate of the first peer to peer device as a function of the QoS service level associated with the second peer to peer device. In various embodiments the second peer to peer device has a QoS service level which is lower than the QoS service level associated with the first peer to peer device.

Assembly of modules 400 further includes a module 418 for receiving from the second peer to peer device, a communications signal transmitted using the QoS privilege obtained by the second device based on the information included in the QoS sharing message, a module for generating tokens in accordance with the rate corresponding to the QoS service level to which the peer to peer device 300 is entitled. In some embodiments the QoS sharing message includes information used to determine at least one of time, frequency, phase, power amplitude of transmission, code rate, encoding method, periodicity, and duty cycle of the communications signal.

The modules shown in dashed line boxes, e.g., modules 410, 412, 420 etc., are optional, and thus one or more of these modules may be present in some embodiments while not in others. The dashed boxes indicate that although these modules are included in the assembly of modules 400 in various embodiments, the processor 302 may execute such an optional module in embodiments where the step to which these modules correspond, is performed. In some embodiments, one or more modules shown in FIG. 4 which are included within another module may be implemented as an independent module or modules.

FIGS. 5 and 6 show exemplary embodiments in which QoS privileges are associated with token that may be used to obtain access to communications resources. While the exemplary embodiments involve the use of QoS tokens, it should be appreciated that the methods and apparatus described herein can be used in non-token based QoS embodiments and embodiments where tokens are used in a different manner than shown in the FIGS. 5 and 6 examples. Accordingly, it should be appreciated that the FIGS. 5 and 6 examples are intended to facilitate an understanding of various embodiments but not limit the scope of the application to the specific exemplary embodiments.

FIG. 5 illustrates an exemplary table 500 including information regarding various QoS service levels and different associated elements corresponding to each of the QoS service levels, in accordance with an exemplary embodiment. The table 500 is, e.g., included as part of memory 304 of wireless terminal 300 and may be used to implement a method, e.g., in accordance with flowchart 200 of FIG. 2. Table 500 illustrates exemplary QoS privileges, and token generation rates corresponding to a plurality of exemplary QoS service levels. In this example, there are three different QoS service levels: a first level, e.g., gold level, a second level, e.g., silver level, and a third level, e.g., bronze level. The first level, e.g., gold level, is the highest QoS service level; the second level, e.g., silver level, is an intermediate QoS service level; and the third level, e.g., bronze level, etc. Three different QoS service levels are shown for simplifying the example, however it should be appreciated that a different number of QoS service levels are possible in some embodiments. The second column 504 in table 500 shows information regarding different QoS privileges corresponding to the each of the different QoS service levels in the corresponding rows. The third column 506 in table 500 shows information regarding different allowable token generation rates corresponding to the each of the different QoS service levels in the corresponding rows. In accordance with one aspect of some embodiments, and as illustrated in table 500, a user of peer to peer device with a QoS service level of Gold, is entitled to use one or more differnt QoS privileges such as G1, G2, . . . , Gn, associated with the Gold service level. In some embodiments the QoS privileges correspond to, e.g., fraction of times the peer to peer device can access the communications resources, amount of communications resources that the device can access or attempt to access, a data transmission rate that the device can use, an amplitude of transmission, a transmission power level, code rate etc. Similarly, a user of peer to peer device with a QoS service level of Silver, has one or more different QoS privileges such as S1, S2, . . . , Sn, associated with the Silver QoS service level while a user with a QoS service level of Bronze has one or more different QoS privileges such as B1, B2, . . . , Bn associated with the Bronze service level. It should be noted that the sets of QoS privileges associated with each of the different QoS service levels, are different even though some of the individual privileges may be the same. For example, G1 may correspond to an allowed transmission data rate for the GOLD user, and S1 may correspond to an allowed transmission data rate for the SILVER user, with G1 being higher than S1.

The third column 506 shows token generation rates corresponding to the each QoS service levels. The token generation rate for Gold service level is rate 1, e.g., 6 tokens/sec. The token generation rate for Silver service level is rate 2, e.g., 3 tokens/sec, and the token generation rate for Bronze service level is rate 3, e.g., 2 tokens/sec. In some embodiments the token generation rate of the higher QoS service level device is reduced while sharing the QoS privilege with the lower QoS service level device. In some embodiments the same peer to peer device may, and sometimes does, generate QoS tokens at different rates at different times, e.g., due to a change in its QoS service level and/or due to obtaining a QoS privilege corresponding to a higher QoS service level.

In some embodiments QoS service level is temporarily shared between the first peer to peer device 102 with a, e.g., Gold service level, and a second peer to peer device 104 with a, e.g., Silver service level, and the second device 104 is given the permission to obtain one or more QoS privileges to which the first device 102 is entitled, for communicating with the first device. In some embodiments the first device 102 indicates (e.g., in a QoS sharing message) an amount of QoS service level increase the second peer to peer device 104 is entitled, for communications with said first peer to peer device. In some embodiments when one or more QoS privileges are shared between the first and second peer to peer devices, this includes the second device 104 being granted the right to generate token at a higher rate, e.g., rate higher than to which the second peer to peer device 104 is entitled, for the time the second peer to peer device 104 is communicating with the first peer to peer device 102. It should be noted that right to generate extra tokens is granted to the second device 104 so that it can use the shared QoS privileges corresponding to the higher QoS service level of the first device 102. Normally tokens generated by a device are used amongst a plurality of applications being executed by the device. If the second device 104 does not have a right to generate tokens at a higher rate, it may not be able to assert the obtained QoS privilege. In various embodiments the QoS related parameters, e.g., the QoS privileges and/or token generation rights, which are shared between the first and second devices 102, 104 may be valid for a limited time and/or use with a particular application.

FIG. 6 illustrates an exemplary table 600 which shows various QoS privileges corresponding to different QoS service levels and the number of tokens spent when different QoS privileges are asserted, in accordance with one exemplary embodiment. The first column 602 in table 600 includes number of tokens that are spent for using different QoS privileges shown in the second column 604. Each item in column 602 represents the number of tokens that a device needs to spend in order to assert a particular QoS privilege shown in the corresponding row out of the QOS privileges shown in column 604. The devices authorized for one or more QoS privileges, e.g., due to their subscription, use tokens to assert the QoS privileges. A device can use a QoS privilege if it has a token to use the QoS privilege, but cannot do so if it does not have a token to use the QoS privilege. In some embodiments a device cannot use a QoS privilege which is allowed by a QoS level to which it does not subscribe even if it has a large number of tokens corresponding to a lower QoS level, e.g., a SILVER user cannot expend 3 tokens to avail itself of a QoS privilege of a Gold user which requires a Gold level token. However, if the higher level user shares its QoS privileges then the lower level user may obtain access to the higher QoS level and the features it provides.

For example, as shown a device which uses the QoS privilege G1, spends 3 tokens. As an example it is shown (row 606) that QoS privilege G1 corresponds to a fraction of time a user is allowed to access communications resources per traffic transmission slot. Although a user, e.g., a GOLD user, may be entitled for this QoS privilege G1, the user still needs to spend 3 tokens in order to access the communications resources for the fraction of time it is allowed to do so.

Similarly consider the individual entries in columns 602, 604 in each individual corresponding row. In the example G2 corresponds to, e.g., allowed transmission power level for GOLD level users. Information in row 608 shows that the user entitled for QoS privilege G2 may need to spend 2 tokens in order to assert QoS privilege G2, e.g., to transmit information at the particular transmission power level. In the same manner each of the different rows 610, 612, 614, 616 include information indicating the number of tokens that a device may need to spend to use a corresponding QoS privilege.

In accordance with one feature, when QoS sharing occurs between a lower QoS service level device such as peer to peer device 2 104 and higher QoS service level device 1 102, the second device 104 obtains a QoS privilege to which the first device 102 is entitled. In various embodiments the first device 102 also shares the right to generate tokens with the second device 104 so that the second device 104 may have sufficient tokens in order to make use of the obtained QoS privilege and access the communications resources accordingly for communicating with the first device 102.

Figure 7:
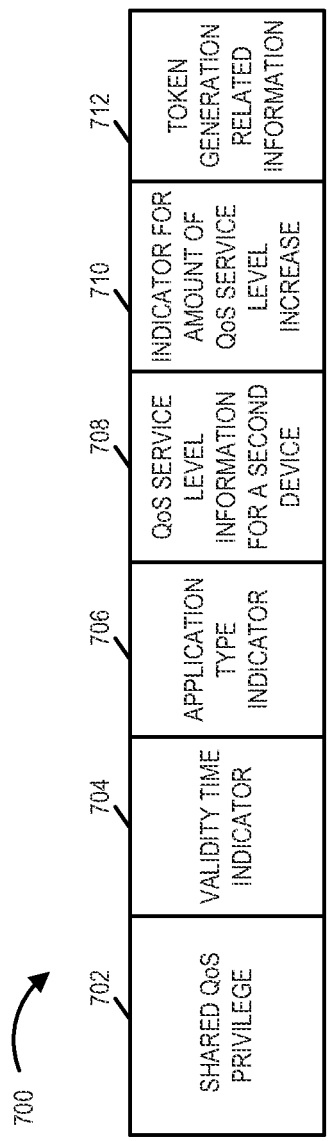
FIG. 7 illustrates an exemplary QoS sharing message including various exemplary fields of information, in accordance with an exemplary embodiment.

FIG. 7 illustrates an exemplary QoS sharing message 700 including various exemplary fields of information, in accordance with an exemplary embodiment. Exemplary QoS sharing message 700 is generated by an exemplary peer to peer communications device, e.g., first device 102, entitled to a higher QoS service level and seeking to communicate with a second device, e.g., device 104 having lower QoS service level.

The exemplary QoS sharing message 700 includes shared QoS privilege information field 702, a validity time indicator field 704, an application type indicator field 706, QoS service level information for a second device field 708, indicator for amount of QoS service level increase 710, token generation related information field 712. In some embodiments the QoS sharing message 700 may have additional fields including information useful for a device, e.g., second device 104 with which QoS privilege is being shared.

The first field 702 includes information regarding a QoS privilege being shared with the second device 104. As discussed in the FIG. 6 example a plurality of QoS privileges could be associated with a device. One or more of such QoS privileges may be shared by a higher QoS service level device with a lower QoS service level in accordance with various embodiments. Thus in some embodiments field 702 includes information specifying which QoS privilege is being shared.

Field 704 includes a time indicator which indicates a period of time for which the QoS privilege is valid. For example, the second device 104 may obtain a QoS privilege for communicating with the first device 102, however there may be restrictions on the time interval for which the obtained QoS privilege can be used for communicating with the first device 102. In some embodiments the time indicator field 704 indicates that an obtained QoS privilege can be asserted for the time period until the communications session between the first and second devices 102, 104 is active. In some other embodiments, a particular time interval may be indicated in field 704 to indicate the validity of the QoS privilege.

Field 706 includes an application type indicator indicating a type of application for which the QoS privilege may be used. The device obtaining the QoS privilege may have several applications which run on the device. Normally QoS privileges, to which the device is entitled, are shared by one or more of these applications. The applications include, e.g., voice application, video application, data application etc. Some applications include latency dependent applications. Rules for allocating tokens or using a QoS privilege for various different applications are followed by the devices. In some embodiments the second device 104 may not have complete liberty in deciding for which application(s) an obtained QoS privilege or a token, may be used. Rather, the QoS sharing message 700 indicates in field 706, the application type(s) for which the obtained QoS privilege may be used. In some embodiments the first device 102 with the higher QoS service level decides type(s) of application for which the obtained QoS privilege may be used by the second device 104.

Field 708 includes QoS service level information for the second device 104 indicating a QoS service level to which the second device 104 is entitled for communicating with the first device 102. For example, in some embodiments the second device 104 with lower QoS service level is allowed to temporarily upgrade to a higher QoS service level, e.g., next higher QoS service level, when communicating with the first device 102. In some such embodiments, the second device 104 is then able to use one or more QoS privileges associated with the next higher QoS service level, for communicating with the first device 102. In some embodiments the next higher QoS level for which the second device 104 temporarily upgrades for communicating with the first device 102, is higher than the original QoS service level associated with the second device 104 but lower than the QoS service level associated with the first device 102.

Field 710 of the QoS sharing message 700 includes an indicator which indicates an amount of QoS service level increase that the second device 104 is entitled for communicating with the first device 104. In some embodiments the amount of QoS service level increase is intended to indicate an amount of increase in the token generation rate for the second device 104, and the tokens generated as a result of increase in the token generation rate can be used by the second device 104 to assert a QoS privilege, e.g., a QoS privilege indicated in field 702, for communications with the first device 102. In some embodiments the QoS service level to which the first device 102 is entitled, is decreased as a function of the amount of QoS service level increase indicated to the second device 104, in the field 710 of message 700.

Field 712 includes token generation related information for the second peer to peer device 104. The token generation related information includes, e.g., a right to generate tokens temporarily given to the second device 104, one or more parameters used in generating tokens temporarily for a period of time at a token generation rate to which the first device 102 is entitled, etc. In some embodiments the QoS sharing message 700 provides information regarding restrictions on the use of an obtained QoS privilege by the second peer to peer device 104, for the communication with the first peer to peer device 102. In some embodiments the restrictions include at least one of: duration, session, or applications for which the obtained QoS privilege by the second peer to peer device can be used.

Figure 8:
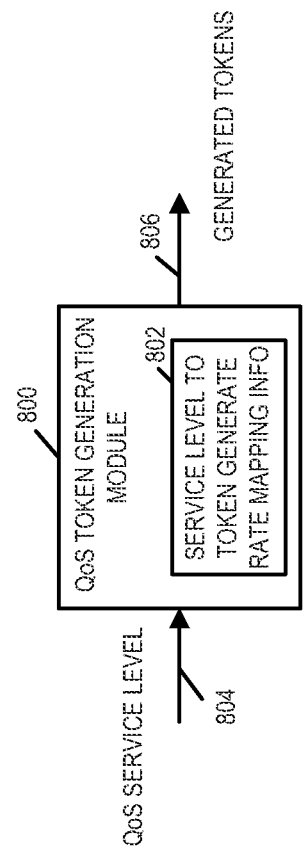
FIG. 8 illustrates an exemplary QoS token generation module included in an exemplary peer to peer device.

FIG. 8 illustrates an exemplary QoS token generation module 800 included in an exemplary peer to peer device, e.g., first peer to device 102. QoS token generation module 800 generates and outputs QoS tokens 806 as a function of QoS service level input 804 and service level to token generation rate mapping information 802. The generated tokens may be stored in the peer to peer device memory, e.g., memory 304, or another storage module in the first peer to peer device 102. Service level to token generation mapping information 802 is, e.g., table 500 of FIG. 5. The service level to token generation mapping information 802 in some embodiments, is included as part of module 602. In some other embodiments the service level to token generation mapping information is stored externally to module 802 in memory and used by module 800. In some embodiments QoS token generation module 800 is module 426 of assembly of modules 400 of FIG. 4.

Figure 9:
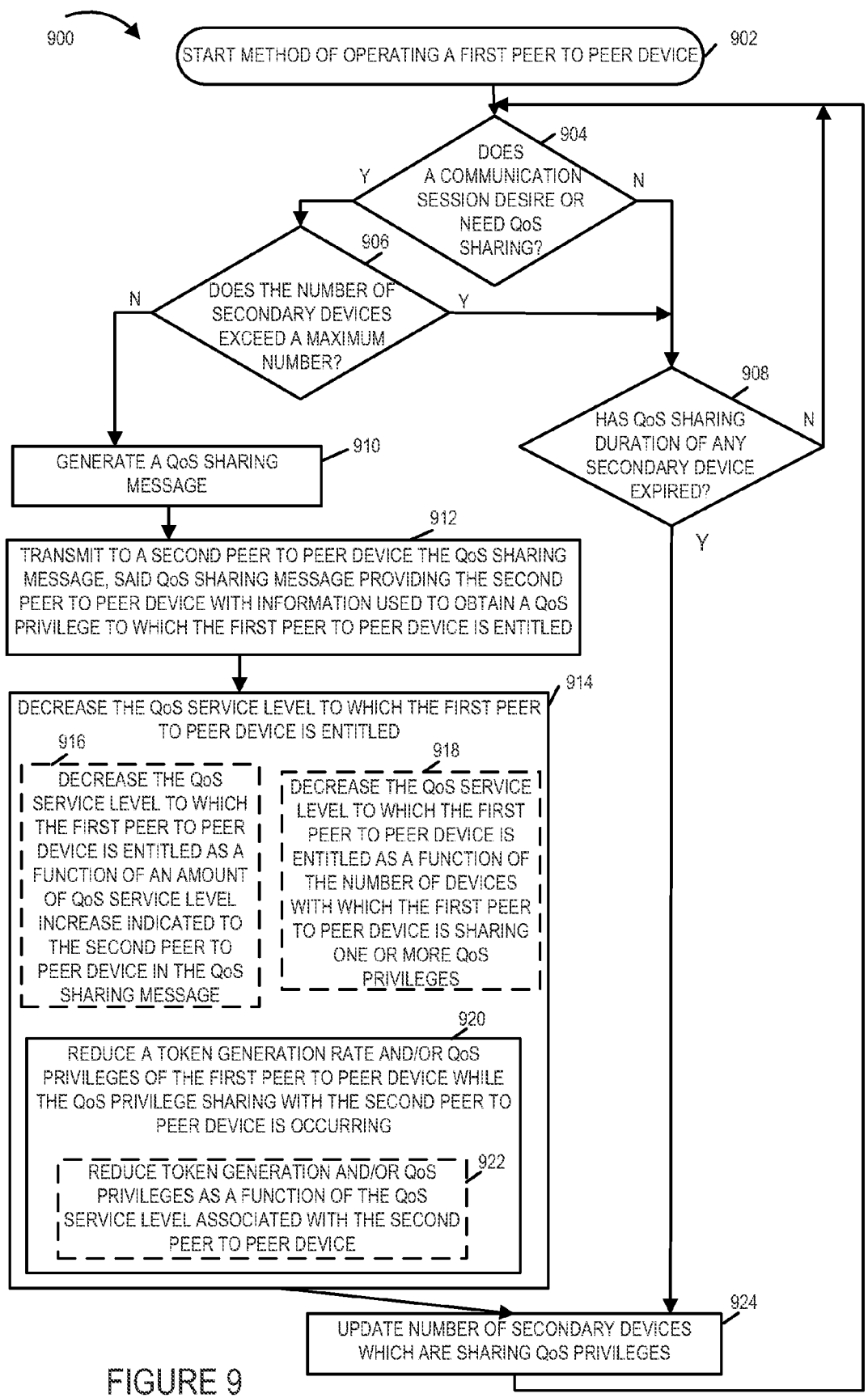
FIG. 9 illustrates an exemplary method of operating a first peer to peer device, in accordance with one exemplary embodiment.

FIG. 9 is a flowchart 900 of an exemplary method of operating a first peer to peer device, in accordance with an exemplary embodiment. The first peer to peer device implementing the method of flowchart 900 is, e.g., any one of the wireless communications devices of system 100 of FIG. 1, such as the first device 1 102. As will be discussed, in accordance with one feature, the first peer to peer device 102 with a higher QoS service level shares one or more of its QoS privileges with one or more secondary devices (which are in a communications session with the first device 102) secondary devices having a lower QoS service level associated with them.

Operation starts in step 902, where the first peer to peer device is powered on and initialized. Operation proceeds from start step 902 to step 904. In step 904 the first peer to peer device 102 determines if QoS sharing is desired or needed for one or more communication sessions in which the first device 102 is involved. It should be appreciated that QoS sharing may be desired where the secondary device(s) participating in the communications session is entitled to lower QoS service level, and the first device 102 wishes to improve the quality, e.g., throughput, of the communications or an application being run. For example, when the first peer to peer device 102 is playing a game in which one or more secondary devices with lower QoS service levels are also participating, QoS sharing may be desired by the first peer to peer device 102 for a better and an overall improved gaming experience. If it is determined that QoS sharing is desired for one or more communications sessions, the operation proceeds to step 906 otherwise the operation proceeds from step 904 to step 908.

In step 906 it is determined whether the number of secondary devices with which one or more QoS privileges are desired or needed as determined in step 904 plus the number of secondary devices for which QoS sharing is currently being provided, exceeds a maximum number of devices, e.g., a predetermined number for which QoS sharing is permitted. The predetermined number may be a number based on or specified by the QoS agreement to which the user of the first peer to peer device subscribes and in some embodiments limits the number of devices with which QoS privilages may be shared at a point in time. Based on the determination, if the number of secondary devices exceeds the maximum predetermined number of devices, the operation proceeds from step 906 to step 908. This path is taken to make sure that the number of QoS devices which are allowed to share QoS privileges does not exceed the maximum number permitted. In step 908 the first peer to peer device 102 determines if a QoS sharing duration for a secondary device has expired. The QoS sharing duration corresponding to one or more secondary devices is e.g., a time duration for which the one or more secondary devices have been allowed to use a QoS privilege to which the first peer to peer device is entitled. If the QoS sharing duration for a secondary device has expired, the operation proceeds from step 908 to step 924, otherwise the operation proceeds from step 908 back to step 904 as shown.

Returning now to step 906. If in step 906 it is determined that if the number of secondary devices for which QoS sharing is desired or needed plus the number of devices with which one or more QoS privileges are currently shared, does not exceed the maximum predetermined number, operation proceeds from step 906 to step 910. Steps 910, 912 and 914 in the exemplary embodiment discussed in flowchart 900 are similar to steps 204, 206 and 208 respectively and therefore will be discussed briefly. In step 910 the first device 102 generates a QoS (Quality of Service) sharing message. Operation proceeds from step 910 to step 912 where the device 1 102 transmits to a second peer to peer device, e.g., device 2 104, the QoS sharing message providing the second peer to peer device with information used to obtain a QoS privilege to which the first peer to peer device 1 102 is entitled. In various embodiments the QoS privilege corresponds to a QoS service level to which the user of the first peer to peer device 102 subscribes, and which is higher than a QoS service level to which the user of said second peer to peer device 104 subscribes.

Operation proceeds from step 912 to step 914. In step 914 the QoS service level to which the first peer to peer device 102 is entitled, is decreased. In some but not necessarily all embodiments, one or more of the steps 916, 918 and 920 are be implemented as part of step 914. In some such embodiments, step 916 is performed to decrease the QoS service level to which the first device 102 is entitled as a function of the amount of QoS service level increase indicated to a secondary device, e.g., second device 104, in the QoS sharing message. In step 918 the QoS service level to which the first peer to peer device 102 is entitled is decreased as a function of the number of secondary devices with which the first device 102 is sharing one or more QoS privileges. In step 920 QoS privileges and/or a token generation rate of the first peer to peer device 102 is reduced while sharing the QoS privilege with secondary device(s) is occurring. In some embodiments, optional step 922 is implemented as part of step 920. In step 922 the QoS privileges and/or token generation rate of the first device 102 is reduced as a function of the QoS service level associated with the secondary device(s), e.g., second device 104. In some but not all embodiments the amount of reduction in token generation rate of the first device 102 is proportional to the increase in the amount of token generation rate for the secondary device(s). Operation proceeds from step 914 to step 924.

In step 924 the first peer to peer device 102 updates the number of secondary devices with which QoS sharing is occurring. Operation proceeds from step 924 back to step 904.

Figure 10:
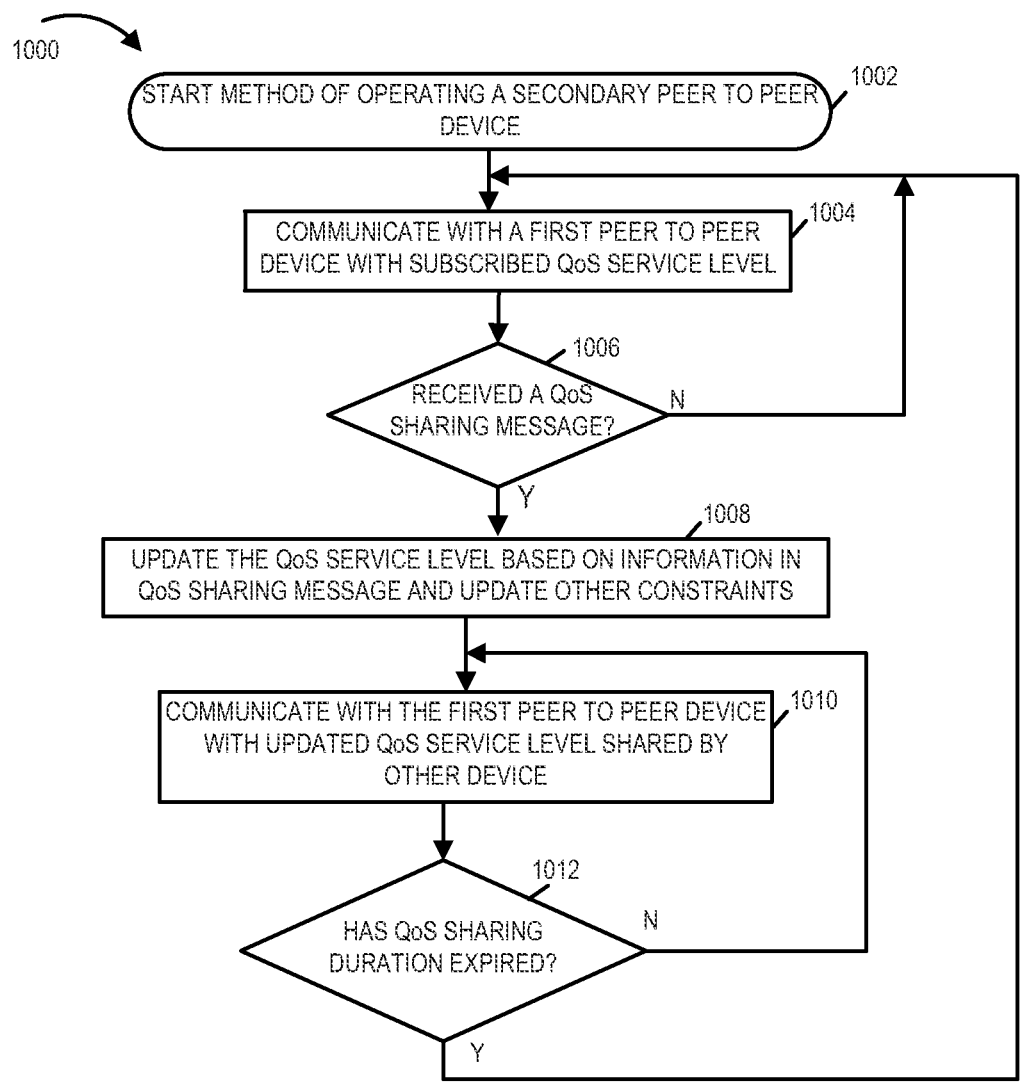
FIG. 10 is a flowchart of an exemplary method of operating a second peer to peer device, in accordance with an exemplary embodiment.

FIG. 10 is a flowchart 1000 of an exemplary method of operating a secondary peer to peer device, in accordance with an exemplary embodiment. The secondary peer to peer device implementing the method of flowchart 1000 is, e.g., any one of the wireless communications devices of system 100 of FIG. 1, such as the second device 2 104. In the following example and in accordance with one aspect a secondary device, e.g., second device 2 104, implementing the method of flowchart 1000 has a lower QoS service level associated with it, as compared to a first peer to peer device, e.g., first device 1 102, which has subscribed to a higher QoS service level. Operation starts in step 1002, where the second peer to peer device 104 is powered on and initialized. Operation proceeds from start step 1002 to steps 1004. In step 1004 the second peer to peer device 102 communicates with another device, e.g., the first peer to peer device 102, with the subscribed QoS service level.

Operation proceeds from step 1004 to step 1006. In step 1006 the second device 104 determines whether a QoS sharing message is received, e.g., from the first peer to peer device 102. If receipt of a QoS sharing message is not detected, the second device 104 continues to communicate with the other device using the QoS privileges of the subscribed QoS service level as in step 1004. If in step 1006 it is determined that a QoS sharing message is receive, operation proceeds from step 1006 to step 1008. In step 1008 the second device 104 updates its QoS service level based on the information in the QoS sharing message, and updates other constraints, e.g., such as the duration for which updated QoS level privileges are allowed, which devices, applications and/or communications sessions the updated QoS level and/or privileges may be used, etc/In a token based QoS approach, information on a new or updated token generation rate allowed by the QoS privilege may be updated.

Operation proceeds from step 1008 to step 1010. In step 1010 the second device 104 communicates with the first peer to peer device using the updated QoS service level shared by the first peer to peer device 102. Communicating with the updated QoS service level includes using one or more obtained QoS privilege(s) associated with the updated QoS service level which is higher than the QoS service level to which the second device 104 is subscribed.

Operation proceeds from step 1010 to step 1012. In step 1012 the second peer to peer device 104 determines whether or not a QoS sharing duration has expired. The QoS sharing duration corresponding to secondary devices is e.g., a time duration for which the second device 104 has been allowed to use the higher QoS service level shared by the first device 102 and/or a QoS privilege corresponding to the higher QoS service level shared by the first device 102. If the QoS sharing duration for the second device 104 has not expired, the operation proceeds from step 1012 to step 1010 and the second device 104 continues to communicate with updated (higher) QoS service level shared by the first device 102. If the QoS sharing duration for the second device 104 has expired, the operation proceeds from step 1012 back to step 1004.

In accordance with at least embodiments, a peer-to-peer device with higher level of QoS privileges than a device with which it is seeking to communicate is allowed to share some or all of its QoS privileges with the device with which it is seeking to communicate. The QoS sharing may be for a limited time and potentially limited on a communication session and/or application basis. Thus in at least some embodiments a device in a set of devices which are having a communications session or a communications session, entitled to a lower level of QoS level than another device in the set of devices, is provided with the QoS level of the device in the set of devices with the higher level of QoS on a limited basis, e.g., for purposes of communicating with the device corresponding to the higher level of QoS. In this manner the device entitled to the higher level of QoS benefits from its QoS level subscription even while communicating with devices entitled to a lower QoS level. However, in some embodiments, the device entitled to the lower QoS level is limited in that it receives the higher QoS level on a limited basis, e.g., for communication with the device entitled to the higher QoS level and/or for applications or communications authorized by the higher QoS level device to receive the benefits of the higher QoS level.

Control over sharing of QoS levels is achieved, in some embodiments, by the passing of QoS parameters from the primary (high QoS level device) to the secondary device. This may be done by way of a QoS information and/or rights sharing message sent from a device entitled to a high QoS level to a device entitled to a lower Qos level. The QoS information and or rights sharing message may include parameters which are used to obtain the QoS privileges, e.g., a key, QoS token generation information or some other security information used to control access to QoS related privileges. The parameters may be valid for a limited time and/or for use with a particular application. Such time constraints may, and in some embodiments are, expressly specified in the QoS sharing message. The rights to QoS privileges made possible by the information included in a QoS privilege sharing message may be limited to use for communications between, e.g., to/from, primary and secondary devices in a communications session where the primary device is the device with the higher QoS priority and the secondary device is the device with the lower QoS priority. The QoS privileges sharing message may, and in some embodiments does, include identifiers corresponding to each device in a communications session which may use the QoS privileges/rights granted by the QoS privilege sharing message. In some embodiments where more than two device are in a communications session, the QoS privilege sharing message may grant multiple devices, e.g., two or 3 devices, the right to share in the QoS privileges of the primary device participating in a multi-party communications session. Via the exchange of parameters, the primary device has control over the QoS level provided to the secondary (lower QoS level device) and/or other devices to which the message is directed, for communications with the primary device. The parameters communicated in a QoS privileges sharing message may include tokens used for QoS purposes and/or information used to control the generation of tokens used to control QoS privileges. The primary device may be constrained in its ability to issue tokens, e.g. tokens issued by the primary device and passed to the secondary device may be useful in obtaining QoS privileges, e.g., the right to communications resources, for communications with the primary device but not other devices.

In some but not all embodiments, the QoS privileges of the device granting one or more other devices the right to share QoS privileges has its QoS level reduced to mitigate the overall effect of sharing QoS privileges with one or more other devices. In such embodiments, for example, a Gold level device may have its right to generate QoS tokens used to gain access to QoS privileges reduced slightly to take into consideration the limited grant of QoS privileges to another device. In some embodiments the reduction in QoS privileges to the high priority user lowers the QoS level provided to the high priority level user but not to the point where the high priority level user receives a service level equal to or lower than the next available service level, e.g., a silver service QoS service level. In some but not all embodiments the reduction in QoS privileges to a high priority level user sharing QoS privileges is equal to the amount of increase in QoS privileges provided to the device with which QoS privileges are being shared.

Thus, in accordance with at least some embodiments, a peer-to-peer device with higher level of QoS privileges than a device with which it is seeking to communicate is allowed to share some or all of its QoS privileges with the device with which it is seeking to communicate. The QoS sharing may be for a limited time and potentially on a communication session and/or application basis. Thus the device entitled to the lower level of QoS is provided with the QoS level of the device in the communications session with the higher level of QoS on a limited basis, e.g., for purposes of communicating with the device corresponding to the higher level of QoS. In this manner the device entitled to the higher level of QoS benefits from its QoS level subscription even while communicating with devices entitled to a lower QoS level. However, it is useful to note that in some embodiments the device entitled to the lower QoS level only receives the higher QoS level on a limited basis, e.g., for communication with the device entitled to the higher QoS level and/or for applications or communications authorized by the higher QoS level device to receive the benefits of the higher QoS level. Thus, differentiation between QoS levels is maintained and users are encouraged to obtain and pay for higher QoS levels when they want to be sure of a higher quality of service.

As discussed above control over sharing of QoS levels is achieved, in some embodiments, by the passing of QoS parameters from the primary (high QoS level device) to the secondary device. The parameters may be valid for a limited time and/or for use with a particular application. They may be limited to use for communications between the primary and secondary device. Via the exchange of parameters, the primary device has control over the QoS level provided to the secondary (lower QoS level device) for communications with the primary device. The parameters may include tokens used for QoS purposes and/or parameters used to generate QoS tokens. In some embodiments the tokens are used to control access to communications resources. Tokens may expire on use or be valid for a limited time depending on the particular embodiment. The primary device may be constrained in its ability to issue tokens and/or provide information used to control QoS token generation such that tokens or toke generation information is useful to a device receiving the tokens or token generation in obtaining resources for communications with the device providing the tokens or token generation information but not other devices.

In various embodiments a communications device, e.g., peer to peer communications device 300 of FIG. 3, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to non-transitory machine, e.g., computer, readable medium, e.g., ROM, RAM, CDs, hard discs, etc., which include machine, e.g., computer, readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

The methods and apparatus are applicable to a wide range of communications systems including many OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as peer to peer mobile nodes which use OFDM and/or CDMA signals to communicate directly with each other without the need for communications to go through an access point or other device. In various embodiments the mobile nodes are implemented as notebook computers, personal data assistants (PDAs), or other portable devices including receiver/transmitter circuits and logic and/or routines, for implementing the described methods.

What is claimed is:

1. A method of operating a first peer to peer device, the method comprising:
   transmitting to a second peer to peer device a QoS sharing message comprising token related information, the QoS sharing message providing the second peer to peer device with information used to obtain a QoS privilege to which the first peer to peer device is entitled; and
   receiving from the second peer to peer device a communications signal transmitted using the QoS privilege obtained by the second peer to peer device based on the information included in said QoS sharing message.

2. The method of claim 1, wherein said QoS sharing message includes restriction information indicating at least one of: a communications session or an application for which the obtained QoS privilege can be used.

3. The method of claim 1, wherein said QoS sharing message provides information used to obtain the QoS privilege for communication with the first peer to peer device but not with other devices.

4. The method of claim 1, wherein said token related information comprises token generation information indicating the right to generate tokens used to obtain a level of service corresponding to a QoS service level associated with the first peer to peer device.

5. The method of claim 1, further comprising:
reducing QoS privileges of said first peer to peer device while sharing the QoS privilege with said second peer to peer device is occurring.

6. The method of claim 1, wherein said QoS sharing message indicates an amount of QoS service level increase the second peer to peer device is entitled, for communications with said first peer to peer device.

7. The method of claim 6, further comprising:
decreasing the QoS service level to which the first peer to peer device is entitled as a function of the amount of QoS service level increase indicated to said second peer to peer device.

8. The method of claim 1, further comprising:
tracking a number of devices with which said first peer to peer device is sharing one or more QoS privileges; and
limiting the number of devices with which said one or more QoS privileges are shared to a predetermined maximum number of devices.

9. The method of claim 8, further comprising:
decreasing the QoS service level to which the first peer to peer device is entitled as a function of the number of devices with which said first peer to peer device is sharing one or more QoS privileges.

10. A first peer to peer device, comprising:
means for transmitting to a second peer to peer device a QoS sharing message comprising token related information, the QoS sharing message providing the second peer to peer device with information used to obtain a QoS privilege to which the first peer to peer device is entitled; and
means for receiving from the second peer to peer device a communications signal transmitted using the QoS privilege obtained by the second peer to peer device based on the information included in said QoS sharing message.

11. The first peer to peer device of claim 10, wherein said QoS sharing message includes restriction information indicating at least one of: a communications session or an application for which the obtained QoS privilege can be used, and further wherein said token related information comprises token generation information.

12. The first peer to peer device of claim 10, wherein said QoS sharing message indicates an amount of QoS service level increase the second peer to peer device is entitled, for communications with said first peer to peer device.

13. The first peer to peer device of claim 12, further comprising:
means for decreasing the QoS service level to which the first peer to peer device is entitled as a function of the amount of QoS service level increase indicated to said second peer to peer device.

14. The first peer to peer device of claim 10, further comprising:
means for tracking a number of devices with which said first peer to peer device is sharing one or more QoS privileges; and
means for limiting the number of devices with which said one or more QoS privileges are shared to a predetermined maximum number of devices.

15. The first peer to peer device of claim 14, further comprising:

means for decreasing the QoS service level to which the first peer to peer device is entitled as a function of the number of devices with which said first peer to peer device is sharing one or more QoS privileges.

16. A first peer to peer device, comprising:
at least one processor configured to:
transmit to a second peer to peer device a QoS sharing message comprising token related information, the QoS sharing message providing the second peer to peer device with information used to obtain a QoS privilege to which the first peer to peer device is entitled; and
receive from the second peer to peer device a communications signal transmitted using the QoS privilege obtained by the second peer to peer device based on the information included in said QoS sharing message; and
memory coupled to said at least one processor.

17. The first peer to peer device of claim 16, wherein said QoS sharing message includes restriction information indicating at least one of: a communications session or an application for which the obtained QoS privilege can be used, and further wherein said token related information comprises token generation information.

18. The first peer to peer device of claim 16, wherein said at least one processor is further configured to:
track a number of devices with which said first peer to peer device is sharing one or more QoS privileges; and
limit the number of devices with which said one or more QoS privileges are shared to a predetermined maximum number of devices.

19. The first peer to peer device of claim 18, wherein said at least one processor is further configured to:
decrease the QoS service level to which the first peer to peer device is entitled as a function of the number of devices with which said first peer to peer device is sharing one or more QoS privileges.

20. A computer program product for use in a first peer to peer device, the computer program product comprising:
a non-transitory computer readable medium comprising:
code for causing at least one computer to transmit to a second peer to peer device a QoS sharing message comprising token related information, the QoS sharing message providing the second peer to peer device with information used to obtain a QoS privilege to which the first peer to peer device is entitled; and
code for causing said at least one computer to receive from the second peer to peer device a communications signal transmitted using the QoS privilege obtained by the second peer to peer device based on the information included in said QoS sharing message.

21. The method of claim 1, wherein said QoS sharing message includes restriction information indicating an application for which the obtained QoS privilege can be used.

22. The method of claim 1, wherein said QoS sharing message includes restriction information indicating a communications session for which the obtained QoS privilege can be used, and further wherein said token related information comprises token generation information.

23. The method of claim 1, wherein the QoS sharing message grants multiple devices a right to share QoS privileges of the first device, said multiple devices being devices participating in a multi-party communications session with the first device.

* * * * *